(12) United States Patent
Ramamurthy et al.

(10) Patent No.: US 10,015,741 B2
(45) Date of Patent: Jul. 3, 2018

(54) SYSTEM AND METHOD FOR LOW POWER SIGNALING IN A WIRELESS LOCAL AREA NETWORK

(71) Applicant: APPLE INC., Cupertino, CA (US)

(72) Inventors: Harish Ramamurthy, Cupertino, CA (US); Joonsuk Kim, Saratoga, CA (US); Yong Liu, Campbell, CA (US); Christopher Hansen, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/502,811

(22) Filed: Sep. 30, 2014

(65) Prior Publication Data

US 2015/0208349 A1 Jul. 23, 2015

Related U.S. Application Data

(60) Provisional application No. 61/928,914, filed on Jan. 17, 2014.

(51) Int. Cl.
*H04W 52/02* (2009.01)
*H04W 84/12* (2009.01)
*H04W 88/08* (2009.01)

(52) U.S. Cl.
CPC ..... *H04W 52/0212* (2013.01); *H04W 52/028* (2013.01); *H04W 52/0216* (2013.01); *H04W 52/0229* (2013.01); *H04W 52/0235* (2013.01); *H04W 84/12* (2013.01); *H04W 88/08* (2013.01); *Y02D 70/00* (2018.01); *Y02D 70/142* (2018.01); *Y02D 70/22* (2018.01)

(58) Field of Classification Search
None
See application file for complete search history.

(56) References Cited

U.S. PATENT DOCUMENTS

2007/0076683 A1* 4/2007 Chung .............. H04W 52/0216
370/350
2009/0129309 A1* 5/2009 Thubert ................ H04L 1/1887
370/315

(Continued)

FOREIGN PATENT DOCUMENTS

JP 2009-272662 11/2009
JP 2010093441 4/2010

(Continued)

*Primary Examiner* — Nicholas Sloms
(74) *Attorney, Agent, or Firm* — Fay Kaplun & Marcin, LLP

(57) ABSTRACT

A station, a method performed by a station and a corresponding method performed by an access point (AP) of a network to allow the station to operate a wireless local area network (WLAN) radio in a sleep state until the WLAN radio is ready to receive a beacon from the AP. The station includes a low power (LP) radio configured to receive a wake up signal from an AP of a network to which the station is connected. The station further includes a WLAN radio configured to operate in a sleep state until the WLAN radio receives an indication from the LP radio that the wakeup signal has been received, wherein WLAN radio is further configured to operate in a fully awake state after receipt of the indication to receive a beacon from the AP indicating a data transmission is pending for the station.

18 Claims, 6 Drawing Sheets

(56) References Cited

U.S. PATENT DOCUMENTS

| | | | |
|---|---|---|---|
| 2010/0099358 A1 | 4/2010 | Kumar et al. | |
| 2010/0142426 A1 | 6/2010 | Taniuchi et al. | |
| 2011/0058510 A1* | 3/2011 | Thomas | H04W 52/0216 370/311 |
| 2011/0274021 A1 | 11/2011 | He et al. | |
| 2011/0305264 A1* | 12/2011 | Chhabra | H04W 52/0229 375/219 |
| 2012/0120859 A1 | 5/2012 | Stephens et al. | |
| 2014/0126442 A1* | 5/2014 | Jafarian | H04W 52/0212 370/311 |
| 2014/0177501 A1* | 6/2014 | Seok | H04W 52/0216 370/311 |
| 2015/0071141 A1* | 3/2015 | Vallabhu | H04W 52/0229 370/311 |

FOREIGN PATENT DOCUMENTS

| | | |
|---|---|---|
| JP | 2010-103653 | 5/2010 |
| JP | 2010-130096 | 6/2010 |
| JP | 2011-040988 | 2/2011 |
| JP | 2011-049721 | 3/2011 |
| WO | 2014/028247 | 2/2014 |

\* cited by examiner

Wake up Signal
600

| Order | Field | Description |
|---|---|---|
| 1 | Short Source Address | Partial source MAC address or a hash of source MAC address |
| 2 | Beacon Update | Whenever AP updates any beacon parameter, it increases this field by one; so that a STA can quickly tell whether it should check the following beacon for the updated parameter |
| 3 | Downlink Data Indication | Indicate which STA or STAs have pending downlink data. It can be a STA AID bitmap (like TIM in current 802.11), or an address list |

Fig. 6A

Station Indication Signal
650

| Order | Field | Description |
|---|---|---|
| 1 | Short Source Address | Partial source MAC address or a hash of source MAC address or partial AID or similar (non-strictly) unique ID |
| 2 | Short Destination Address | Partial dest MAC address or a hash of dest MAC address or or similar (non-strictly) unique ID |
| 3 | Power Mode | example encoding: PM=0 (active), PM=1 (sleep), PM=3 (sleep but can be woken up with Wakeup message trigger) |

Fig. 6B

SYSTEM AND METHOD FOR LOW POWER SIGNALING IN A WIRELESS LOCAL AREA NETWORK

PRIORITY CLAIM/INCORPORATION BY REFERENCE

This application claims priority to U.S. Provisional Application 61/928,914 entitled "System and Method for Low Power Signaling in a Wireless Local Area Network," filed on Jan. 17, 2014, the entirety of which is incorporated herein by reference.

BACKGROUND INFORMATION

A wireless local area network (WLAN) may be used to exchange data from one station to another station. The station that receives the data may be configured using a duty cycle. The duty cycle may indicate a schedule indicating a time duration in which the WLAN radio of the receiving station is to be activated at select time periods to listen for beacons transmitted from a network component such as an access point of the WLAN. The WLAN radio may be activated for a first predetermined time period within the duty cycle and deactivated or placed to sleep (e.g., hibernate) if no beacon is received in this time period. The WLAN radio may sleep for a second predetermined time period after which the WLAN radio is again activated for the first predetermined time period. This may repeat until a beacon is received by the WLAN radio while activated. The power required to activate and deactivate the WLAN radio is relatively high and may be wasted, particularly when no beacon is received.

SUMMARY

In one exemplary embodiment, a station connected to a network performs a method. The method includes receiving, by a low power (LP) radio of a station, a wake up signal from an access point (AP) of a network the station is connected, the wake up signal configured to fully wake a wireless local area network (WLAN) radio of the station and receiving, by the WLAN radio of the station, a beacon indicating a data transmission is pending for the station.

In another exemplary embodiment, an access point (AP) of a network performs a method. The method includes determining at least one station of the network to receive a data transmission, transmitting a wake up signal to a low power (LP) radio of the at least one station, the wake up signal configured to wake a wireless local area network (WLAN) radio of the at least one station and transmitting, by the AP, a beacon to the WLAN radio of the at least station, the beacon indicating the data transmission is pending for the at least one station.

In a further exemplary embodiment, a station includes a low power (LP) radio and a wireless local area network (WLAN) radio. The LP radio is configured to receive a wake up signal from an access point (AP) of a network to which the station is connected. The WLAN radio is configured to operate in a sleep state until the WLAN radio receives an indication from the LP radio that the wakeup signal has been received, wherein WLAN radio is further configured to operate in a fully awake state after receipt of the indication to receive a beacon from the AP indicating a data transmission is pending for the station.

BRIEF DESCRIPTION OF THE DRAWINGS

FIG. 6A shows an exemplary wake up signal format.

FIG. 6B shows an exemplary station indication signal format.

DETAILED DESCRIPTION

Figure 1:
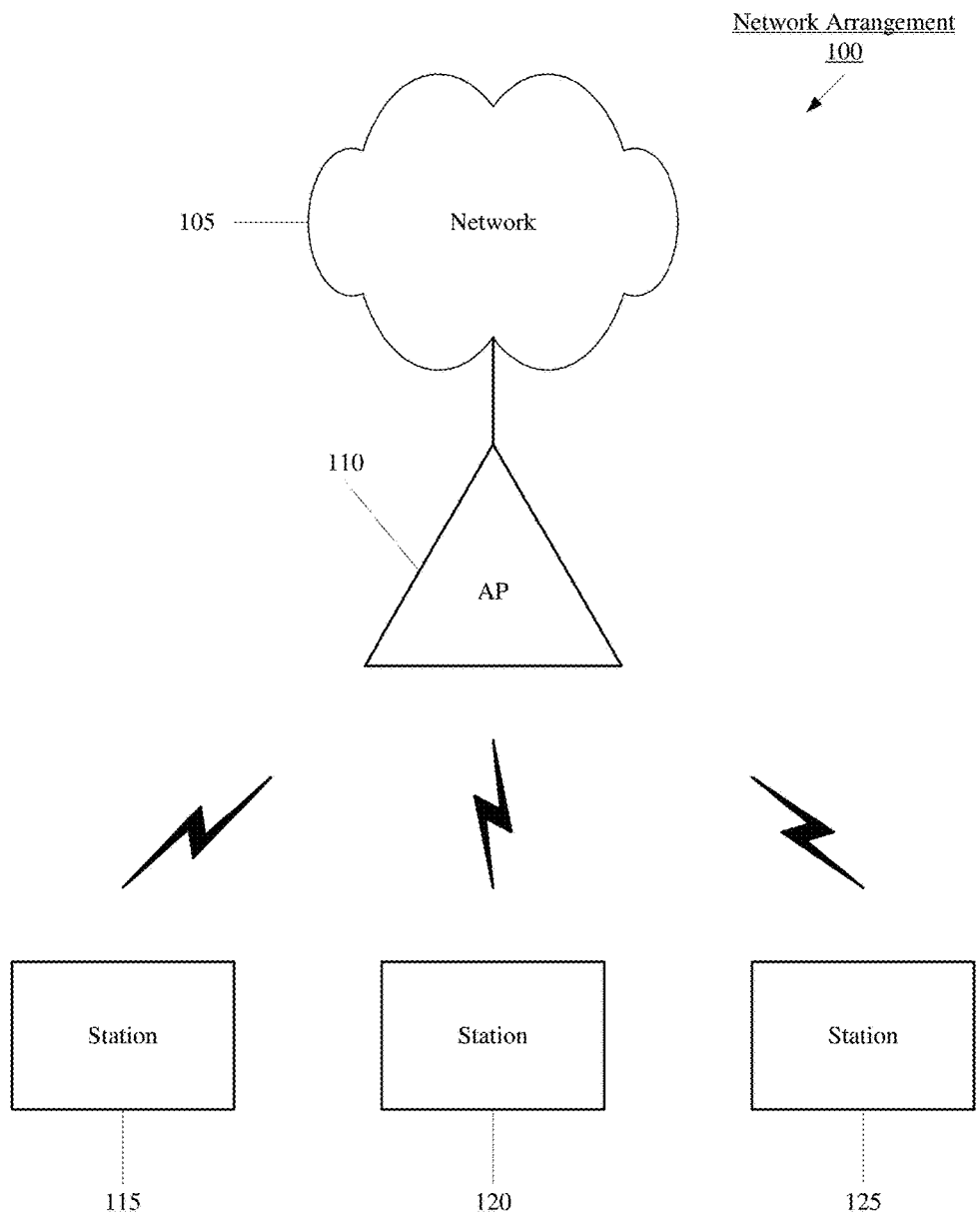
FIG. 1 shows an exemplary network arrangement to transmit an indication prior to transmitting a beacon indicating a subsequent data transmission.

The exemplary embodiments may be further understood with reference to the following description and the related appended drawings, wherein like elements are provided with the same reference numerals. The exemplary embodiments are related to systems and methods for low power signaling in a WLAN. Specifically, an access point (AP) of the WLAN may transmit an indication (e.g., a wake up signal) to a station scheduled to receive a data transmission prior to transmitting a beacon to the receiving station. The receiving station may receive the indication using a first radio to activate a second radio such that the second radio is configured to receive the beacon. The first radio may utilize a low power consumption for operation that is lower than the second radio. Therefore, the receiving station may conserve power by not using the higher power second radio to continuously listen for the beacon. The low power signaling, the indication, the beacon, the AP of the WLAN, the receiving station, the first and second radios, and the power conservation will be described in further detail below.

Initially, it should be noted that the description below relates to using the first and second radios as well as the wake up signal in a WLAN. However, the use of the WLAN is only exemplary. The exemplary embodiments may also be used in various other network types including, for example, a peer-to-peer (P2P) network.

When a station is mobile, it is often restricted to using a portable power supply, which is limited. Therefore, an important design constraint for mobile stations is that a minimal amount of power be used for any given operation to allow the station to be used for a longer duration without being connected to a fixed power source. One particular application in for which lower power consumption is desirable is low data throughput and low duty cycle applications relating to data transmissions. The station may be configured with a duty cycle that indicates time intervals within a given time duration that a radio is to be activated to listen for beacons. The beacon may represent, for example, a management frame in the 802.11 specifications provided by the Institute of Electrical Engineers (IEEE). Specifically, the beacon may include information regarding a pending data transmission to be received by the station.

With a radio used in the 802.11 specifications, the power consumed during the receiving functionality is relatively high. For example, in a 5 GHz network, the power consumption could be 30% more than in a 2.4 GHz network. Those skilled in the art will understand that the power consumption to receive a data transmission is substantially similar to the power consumption to look for a received signal. Accordingly, the radio utilizes a relatively large amount of power each time it is activated and used to receive the beacon.

One manner of reducing this power consumption is maintaining a low duty cycle. For example, the radio consumes the large amount of power for a smaller amount of time, thereby reducing an overall power consumption of the station. For example, a duty cycle at 50% requires that the radio be activated for half the time of the duration of the cycle. By decreasing the duty cycle to a smaller amount such as 10%, the radio is activated for 40% less time within the duration of the cycle. Nevertheless, the large amount of power is still required each time the radio is activated.

Furthermore, the low duty cycle only applies to when the radio is allowed to sleep during times it is not activated or being used. However, this is substantially impossible to achieve on a busy WLAN. For example, the radio must stay awake and activated to receive even undesired packets. In another example, the WLAN may be congested to a degree that a beacon that is scheduled to be received according to a Target Beacon Transmission Time (TBTT) known to the station is delayed. The station may therefore be required to maintain the radio in the full power activated state from the indicated time of the TBTT until the delayed beacon is received.

In addition, the AP of the WLAN may have successfully indicated that there is a packet (i.e., data to be transmitted thereto as indicated in the beacon) pending for the station. However, with a busy WLAN or for other reasons, the station must contend for the medium to send out a power save (PS)-Poll frame to solicit the frame since the radio has been woken from the sleep or power-saving mode. This may further worsen the power consumption, as the radio must be maintained in the activated state until the PS-Poll frame is successfully transmitted to the AP.

The exemplary embodiments provide a mechanism to utilize low power signaling as well as a mechanism to reduce a total time required for the high power consuming radio to be activated. That is, the high power consuming radio is allowed to sleep for an overall longer duration to decrease the power consumption. As used herein, the high power consuming radio will be referred to as a WLAN radio. The exemplary embodiments utilize the WLAN radio and a further low power (LP) radio. The LP radio may utilize a substantially smaller amount of power to operate than the WLAN radio. The LP radio may be configured to receive an indication or wake up signal from the AP of the WLAN. Accordingly, the AP of the WLAN may be configured to provide this wake up signal. The activated LP radio may use a relatively low amount of power and receive the wake up signal, which is used to wake a sleeping WLAN radio (e.g., wake a PHY of the station). In this manner, the WLAN radio is only woken when it is known that subsequent transmissions are destined for the station. Specifically, the WLAN radio is awake to receive a beacon that indicates a subsequent data transmission of pending packets at the AP. As will also be described in further detail below, the exemplary embodiments may provide further mechanisms that substantially prevent the station from contending for a medium as well as enable the LP radio to be used for uplink operations such as providing the PS-Poll frame.

FIG. 1 shows an exemplary network arrangement 100 to transmit an indication prior to transmitting a beacon indicating a subsequent data transmission. The network arrangement 100 may include a network 105 and an AP 110 that is used by a plurality of stations 115-125 to connect to the network. The network 105 may be, for example, a WLAN using a 802.11 specification as defined by the IEEE. However, those skilled in the art will understand that the network 105 may be any type of communications network in which data is exchanged between at least one first electronic device and at least one second electronic device of the network itself. Accordingly, the network arrangement 100 may include further network components (not shown) such as servers, routers, network management arrangements, network databases, etc.

The stations 115-125 may each be connected to the network 105 via the AP 110. Specifically, the stations 115-125 may be associated with the AP 110 using, for example, a handshake functionality. However, the exemplary embodiments also relate to and may be used for stations that are non-AP stations. It should be noted that the number of the stations 115-125 in the network arrangement 100 is only exemplary. Those skilled in the art will understand that any number of stations 115-125 may be present. It should also be noted that the network 105 may have any number of APs that may be used by the stations 115-125 to connect to the network. In addition, there may be other types of devices that allow network access that are not APs. These other types of network access devices may also implement the functionality described herein for the AP 110.

The AP 110 may be configured to transmit data indicated as having a destination to at least one of the stations 115-125. The data that is to be transmitted by the AP 110 to one of the stations 115-125 may be received from the stations 115-125 or from the network 105. For example, the station 115 may transmit data destined for the station 125 via the AP 110. As will be described in further detail below, the AP 110 may initially transmit a wake up signal to the stations that are to receive the data before transmitting a beacon that provides information as to the transmission of the data. After the beacon has been transmitted, the AP 110 may then transmit the data to the stations.

Figure 2:
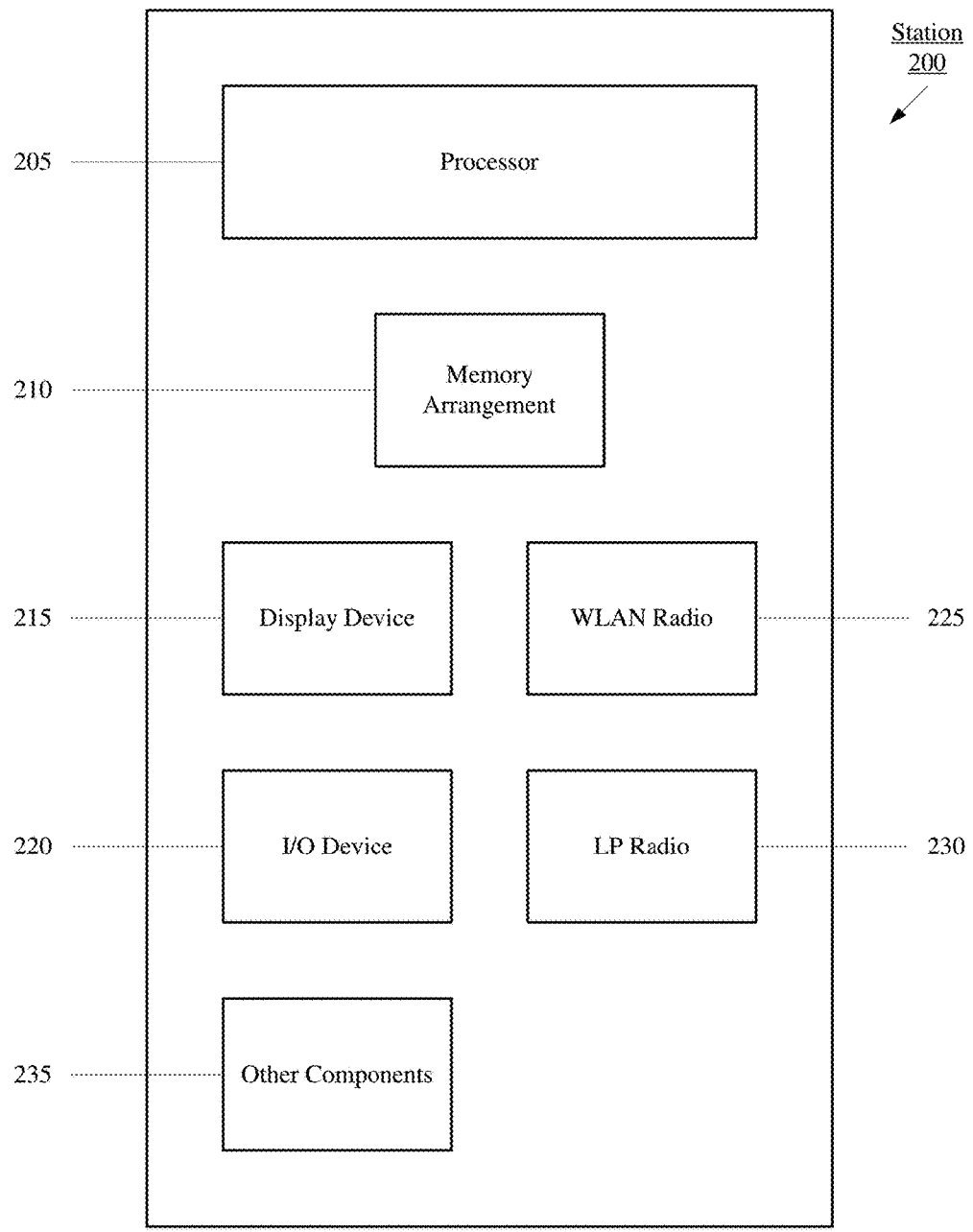
FIG. 2 shows an exemplary station configured to receive the indication, the beacon, and the subsequent data transmission.

FIG. 2 shows an exemplary station 200 configured to receive the indication, the beacon, and the subsequent data transmission. Specifically, the station 200 may represent an electronic device such as the stations 115-125. More specifically, the station 200 may be any portable device configured to exchange data with the network 105 such as a cellular phone, a smartphone, a tablet, a phablet, a laptop, etc. The station 200 may include a processor 205, a memory arrangement 210, a display device 215, an input/output (I/O) device 220, a WLAN radio 225, a LP radio 230, and other components 235.

The processor 205 may be configured to execute a plurality of applications of the station 200. For example, the applications may include a text message application to receive a text from a further station when connected to the network 105. In another example, the applications may include a radio activation application that transmits signals to the WLAN radio 225 to wake it (based upon signals from the LP radio 230) or to place the WLAN radio into a sleep state (e.g., based upon expected transmission inactivity). It should be noted that the applications being a program executed by the processor 205 is only exemplary. The applications may also be represented as a separate incorporated component of the station 200 or may be a modular component coupled to the station 200. It should also be noted that the use of the radio activation application is only exemplary. In another example, a direct signaling path may be established between the WLAN radio 225 and the LP radio 230 in which the LP radio 230 performs the functionalities of the radio activation application. In another exemplary embodiment, the functionalities described for the radio activation application may be implemented in a separate integrated circuit with or without firmware.

The memory arrangement 210 may be a hardware component configured to store data related to operations performed by the station 200. For example, the memory arrangement 210 may store the information received from the AP 110 relating to data transmissions. The display device 215 may be a hardware component configured to show data to a user while I/O device 220 may be a hardware component configured to receive inputs from the user and output corresponding data. The other components 235 may include a portable power supply (e.g., battery), a data acquisition device, ports to electrically connect the station 200 to other electronic devices, an audio I/O device, etc.

The WLAN radio 225 may be a hardware component configured to transmit and/or receive data (e.g., a transceiver) with the network 105. As discussed above, the WLAN radio 225 may be the high power consuming radio used in a 802.11 WLAN. Thus, when activated, the WLAN radio 225 may consume, for example, 180 mW of power when the WLAN operates at 2.4 GHz or 240 mW of power when the WLAN operates at 5 GHz. As will be described in further detail below, the WLAN radio 225 may be in one of two states: awake/activated or asleep/deactivated. When awake, the WLAN radio 225 may be configured to receive a beacon from the AP 110 as well as data scheduled for transmission to the station 200.

Because the WLAN radio 225 operates using wireless signals, these signals are propagated using various frequencies. These frequencies may be attained using, for example, a crystal oscillator. A crystal oscillator is an electronic oscillator circuit that uses the mechanical resonance of a vibrating crystal of piezoelectric material (e.g., quartz crystal) to create an electrical signal with a very precise frequency. As will be described in further detail below, the time required to activate the crystals of the WLAN radio 225 may impact a manner in which the exemplary embodiments utilize the wake up signal. Specifically, the crystals may require 3-5 ms to activate whereas other aspects of the WLAN radio 225 (e.g., PHY) may only require a fraction of that time. For example, for the WLAN radio 225 to be fully awake after the crystals are ON, the PHY may be turned ON. The turning ON of the PHY requires approximately 500 μs to first be placed in a standby mode and approximately another 50 μs to be placed ON. However, it should be noted that the operation to place the PHY from standby to ON may be between 25-100 μs.

It should be noted that the use of crystals in the WLAN radio 225 is only exemplary. For example, non-crystal components may be used. The crystals may represent any oscillator that enables a selection of a frequency. Furthermore, the WLAN radio 225 may use other manners of generating the signals at selected frequencies. For example, non-oscillator components may also be used. Therefore, the crystals described herein may represent any component of the WLAN radio 225 that enables signals to be generated at a known frequency. Those skilled in the art will understand that depending on these other manners, the exemplary embodiments may be modified to accommodate the timing issues with using components in these other manners.

The LP radio 230 may be a hardware component configured to transmit and/or receive signals with the AP 110. Specifically, the LP radio 230 may provide a specified data exchange functionality. As discussed above, the LP radio 230 may receive the wake up signal from the AP 110. In a first example, the LP radio 230 may forward a corresponding signal to the processor 205 such that the radio activation application may wake the WLAN radio 225. For example, the processor may send an activation signal to the WLAN radio 225 to activate the PHY to ON and the crystals may also be activated. In a second example, the activation signal for the WLAN radio 225 may be generated by the LP radio 230 and this activation signal may be sent to the WLAN radio 225 via a direct pathway between the LP radio 230 and the WLAN radio 225. Furthermore, after the activation operation of the WLAN radio 225, the LP radio 230 may be configured to transmit a station indication signal that indicates to the AP 110 the current power state of the WLAN radio 225. That is, the low power signaling may also be used for subsequent signal transmissions that the AP 110 would normally require for the data transmission to be performed. Accordingly, the WLAN radio 225 may not be required to perform this functionality.

As discussed above, the LP radio 230 may use a significantly smaller amount of power when activated as compared to the WLAN radio 225. For example, the LP radio 230 may use 400 μW of power when activated. In comparison to the milli-Watts of power used by the WLAN 225, one skilled in the art will appreciate the amount of power conservation that may be realized. As such, it should be noted that the LP radio 230 may be manufactured with components that are different or less complex than the components used to manufacture the WLAN radio 225 but still configured to perform the functionalities described herein.

It should be noted that the LP radio 230 having a lower power consumption by drawing 400 μW of power in comparison to the 180-240 mW of power drawn by the WLAN radio 225 is only exemplary. Specifically, this smaller amount of power used by the LP radio 230 relates to any further radio that requires less power from being activated than the WLAN radio 225. That is, the overall amount of power used by the LP radio 230 to listen for a beacon is less than the overall amount of power used by the WLAN radio 225 to listen for the beacon.

According to the exemplary embodiments, the AP 110 may be configured to receive or generate data to be transmitted to one or more of the stations 115, 120, 125. Prior to transmitting this data to the selected stations 115-125, the AP 110 may notify the stations 115-125 that there is an incoming data transmission. This notification provides information to the selected stations 115-125 so that the WLAN radio 225 is to be awake and prepared to receive the data transmissions. As discussed above, the WLAN radio 225 may be activated at select time intervals within a duty cycle to receive a beacon. However, according to the exemplary embodiments, the stations 115-125 may utilize the duty cycle to determine when the LP radio 230 is activated. Specifically, the LP radio 230 is activated for the duration of the duty cycle. It is noted that the low power consumption of the LP radio 230 still results in an overall decreased power usage than the standard waking/sleeping of the WLAN radio 225.

While the LP radio 230 is activated, it may listen for an incoming wake up signal that is generated and transmitted by the AP 110. That is, part of the notification performed by the AP 110 includes an initial wake up signal that is received by the LP radio 230. In a first example, the AP 110 may generate the wake up signal for each of the stations 115-125 that is scheduled for a subsequent beacon and data transmission. For example, if all the stations 115-125 are to receive a subsequent beacon and data transmission, the AP 110 may generate a respective wake up signal for each of the stations 115-125. In another example, if the stations 115, 120 are to receive a subsequent beacon and data transmission, the AP 110 may generate a respective wake up signal for only these stations while no wake up signal is generated for the station 125. In a second example, the AP 110 may also generate the wake up signal in a broadcast manner for all the stations 115-125 to check the subsequent beacon (e.g., instead of individual wakeup signals being generated). In a third example, the AP 110 may group the stations and send a wakeup signal in a group manner where one wakeup signal may be transmitted to all the stations in the group.

When the LP radio 230 of the select stations receive the wake up signal, the LP radio 230 may forward an activation signal to the WLAN radio 225 (e.g., as described above, the activation signal may be directly forwarded to the WLAN radio 225 or the LP radio may forward the wake up signal to the processor 205 that generates the activation signal to send the WLAN radio 225). The activation signal may indicate that the WLAN radio 225 is to wake from its sleeping state such as turning the PHY ON and possibly activating the crystals. As discussed above, the activation of the crystals in the WLAN radio 225 may affect the timing of the signal transmissions with the AP 110. Accordingly, the exemplary embodiments provide two mechanisms to use the wake up signal received by the LP radio 230.

In a first exemplary embodiment, the stations 115-125 may be configured to activate the crystal of the WLAN radio 225 for the duration of the duty cycle. That is, the LP radio 230 and the crystal of the WLAN radio 225 may both be activated during the duration of the duty cycle. However, the PHY of the WLAN radio 225 may remain asleep. More specifically, the PHY of the WLAN radio 225 may be on standby (i.e., an intermediary setting between sleep and wake). By activating the crystal of the WLAN radio 225 for the duty cycle prior to a subsequent beacon transmission and placing the PHY on standby, a relatively fast wake up procedure may be provided. Specifically, only the PHY of the WLAN radio 225 is required to be turned ON since the crystal is already activated. As discussed above, the process to place the PHY from standby to ON may need less than 50 µs. Thus, the wake up signal from the AP 110 may be transmitted to the stations 115-125 about 50 µs before a beacon is transmitted. In this way, a sufficient amount of time is provided for the stations 115-125 to be prepared to receive the beacon. Subsequently, a NOW signal may be transmitted from the AP 110 to the stations 115-125 immediately prior to the beacon being transmitted. The NOW signal may allow the stations 115-125 to save further power until an actual beacon transmission.

In a second exemplary embodiment, the stations 115-125 may be configured for the multi-stage wake up procedure. Specifically, the WLAN radio 225 may be asleep in which the crystal is deactivated and the PHY is turned OFF. Thus, to wake the WLAN radio 225, the crystal should be activated (using 3-5 ms) and the PHY should be placed on standby/ON (using 50-550 µs). In view of this extended period of time that is required, the AP 110 may transmit the wake up signal at least 4 ms before the transmission of the beacon to allow sufficient time for the WLAN radio 225 to be fully awake. After the wake up signal is transmitted, the AP 110 may wait this predetermined time period and subsequently transmit the NOW signal immediately prior to the beacon being transmitted. It should be noted the use of 4 ms is only exemplary and different wait times may be used. However, it should also be noted that a delay greater than 4 ms may not be desired due to potential additional power loss.

Those skilled in the art will understand that the wake up signals may cause further stations that are not scheduled to receive a data transmission to also wake. There may be a variety of reasons for such a scenario to arise. Thus, the exemplary embodiments provide a mechanism for the wake up signal to be received only by the intended station. Specifically, the wake up signals are prevented from colliding with other network traffic. In a first example, the specifications defined under 802.11 may be used. Specifically, the 802.11 protection frame may be used prior to sending the wake up signal. In a second example, the wake up signals may be generated in such a way that it is impervious to 802.11 traffic such as using a dedicated channel only for the transmission of wake up signals.

It should be noted that other traffic may be on the air before the beacon is transmitted. In view of this possibility of different transmissions occupying the medium being used for the wake up procedure and beacon transmission, the exemplary embodiments provide the timing feature described above. For the first example, just enough time is set between the transmission of the wake up signal and the transmission of the beacon for the WLAN radio 225 to wake. The NOW signal may immediately be transmitted after transmitting the wake up signal with no gap therebetween. The NOW signal may initially provide the feature of indicating that the beacon is being transmitted immediately after the NOW signal. The NOW signal may also provide a placeholder for the medium such that the medium is still available for the beacon to be transmitted. For the second example, just enough time is set between the transmission of the wake up signal and the transmission of the beacon for the WLAN radio 225 to wake. However, there may be a gap between the transmission of the wake up signal and the transmission of the NOW signal. The NOW signal may therefore be used as described above to hold the medium for the transmission of the beacon immediately following the NOW signal. The NOW signal may also be used to activate a medium access control (MAC) of the station to prepare to receive the beacon.

When viewing the transmission of data from the perspective of the AP 110, the AP 110 may initially transmit a network packet. For example, the network packet may include a request for a medium for the subsequent data transmissions. After the network packet is sent, the Network Allocation Vector (NAV) protection scheme may be used. As discussed above, this may entail using the wake up signal that does not collide with other network traffic. This wake up signal may be transmitted to the select stations 115-125 that will also receive a beacon and subsequent data transmission. The optional filler packet such as the NOW signal may be transmitted immediately prior to the beacon being transmitted. Those skilled in the art will understand the use of an acknowledgement (ACK) signal when a signal has been transmitted. However, the exemplary embodiments may not utilize the ACK when the wake up signal is transmitted. For example, the impervious nature of the wake up signal may negate the need for the ACK.

The wake up signal may be formatted in a variety of manners. However, the wake up signal is designed to be transmitted by the AP 110 and to be received by the LP radio 230 of the selected stations. In an exemplary embodiment, the wake up signal has a predetermined number of bits that are relatively small. For example, only mandatory parameters may be included in the wake up signal. The parameters may include those related to addressing. Since a false positive may cause a redundant wake up, the wake up signal is not required to identify the transmitter and receiver of the radio fully. Thus, a reduced source address may be used (e.g., last 6 bits of MAC address) and a reduced destination address may be used (e.g., last 6 bits of unicast or multicast or partial TIM bitmap). Optional parameters may also be included such as a frame type (e.g., type and sub-type restricted to 6 bits) and an awake/sleep indicator (using 1 bit).

In a specific exemplary format and as illustrated in FIG. 6A, the wake up signal 600 may include three fields. A first field may be a short source address. Examples of a short source address may be the partial source MAC address or a hash of source MAC address. A second field may be a beacon update. For example, whenever the AP 110 updates any beacon parameter, this field may be increased by one. The station may quickly determine whether a check is to be performed for a following beacon for the updated parameter. In a third field may be a downlink data indication. The downlink data indication may be an indication of which station or stations have pending downlink data (i.e., subsequent data transmission after beacon). This may be a station AID bitmap (similar to TIM in the 802.11 specifications) or an address list. As shown in the FIG. 6A, the fields of the wake up signal may also have a specified order so the stations will understand the data that is being received in the wake up signal. However, it is not a requirement that the order be the same as shown in FIG. 6A.

As discussed above, after the WLAN radio 225 has been awoken based on the wake up signal received by the LP radio 230 and the WLAN radio 225 has received the beacon, the LP radio 230 may again be used to indicate the status of the WLAN radio 225 to the AP 110. That is, select ones of the stations 115-125 with the WLAN radio 225 awake may wish to indicate to the AP 110 the wake up status of the WLAN radio 225 and/or solicit a packet, namely the pending data transmission which prompted the wake up procedure. Therefore, the low power signaling may be used in a reverse direction.

When conventional response signals are transmitted, the WLAN radio 225 is used and must contend with other stations to send the PS-Poll frame or NULL or QoS NULL to the AP 110. This may waste a substantial amount of medium time for only a few bits of information (e.g., backoff, 802.11 frame, etc.). The exemplary embodiments provide a mechanism that utilizes the LP radio 230 to transmit the response.

Specifically, the station uses a station indication signal, which is substantially similar to the wake up signal. The station indication signal informs the AP 110 about the current status of the WLAN 125 (e.g., power mode) and whether it has packets to transmit/receive. The station indication signal may be sent as a response to an optional poll transmitted by the AP 110 immediately after the beacon is transmitted. However, even with no poll, the LP radio 230 may be used to transmit the station indication signal. It should be noted that the poll may be transmitted as a separate signal, may be implicit, or may be included with the beacon. In this manner, the low power signaling may again be used to transmit the station indication signal from the stations 115-125 to the AP 110. The station indication signal will not collide with other network traffic. It should be noted that it may be assumed that multiple indication frames may be sent concurrently such as by utilizing different tones.

The station indication signal may also be formatted in a variety of manners substantially similar to the wake up signal. In a specific exemplary format and as illustrated in FIG. 6B, the station indication signal 650 may include three fields. A first field may be a short source address. This field may be substantially similar to the short source address of the wake up signal but may also be a partial AID or similar (non-strictly) unique identifier. A second field may be a short destination address. For example, the short destination address may be a partial destination MAC address, a hash of destination MAC address, or similar (non-strictly) unique identifier. A third field may be a power mode. The power mode may be an indication of the state of the WLAN radio 225. For example, a power mode (PM) of 0 may indicate that the WLAN radio 225 is awake; a PM of 1 may indicate that the WLAN radio 225 is asleep; a PM of 3 may indicate that the WLAN radio 225 is asleep but may be woken up with a wake up signal trigger; etc.

Figure 3:
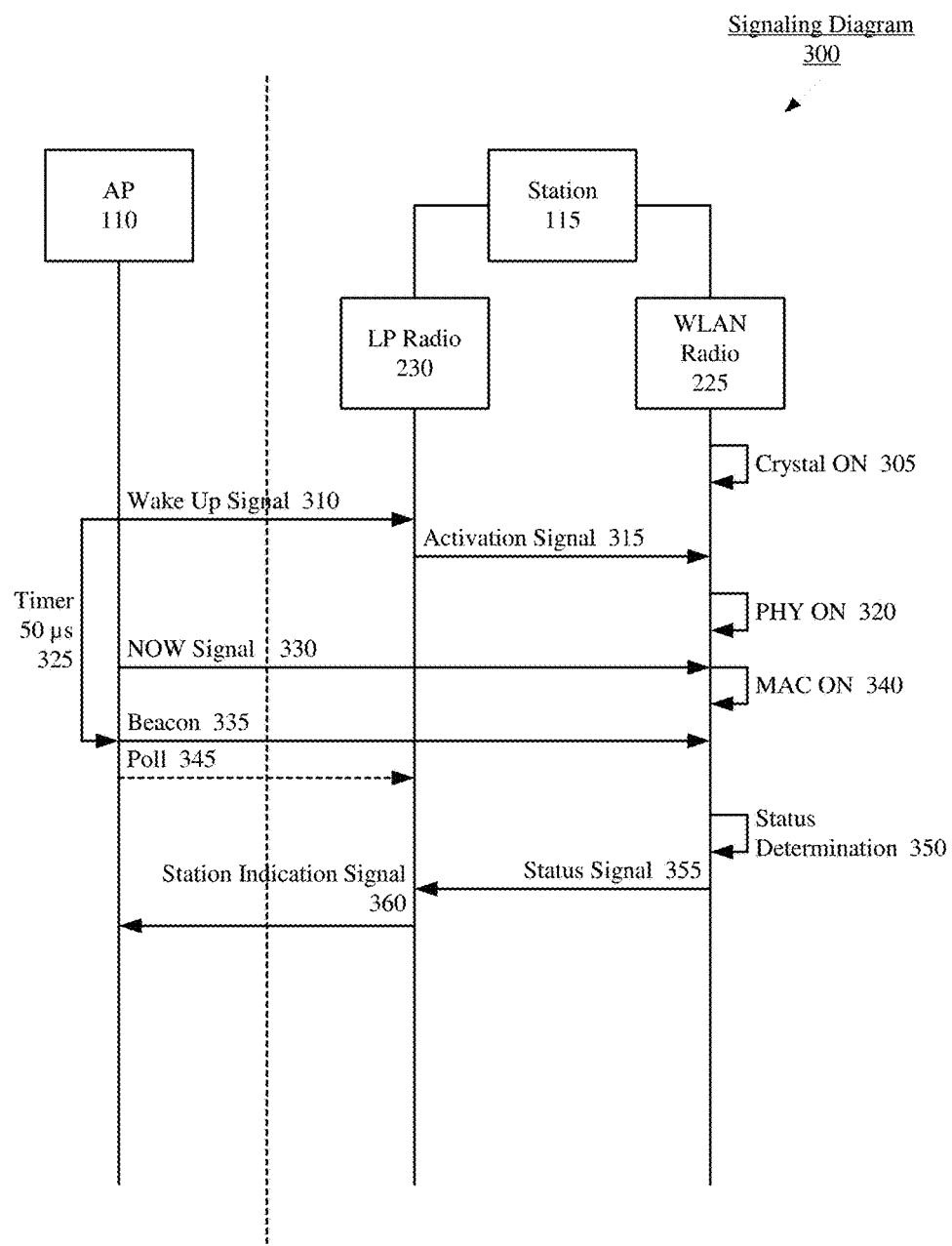
FIG. 3 shows a first exemplary signaling diagram utilizing the wake up signal.

FIG. 3 shows a first exemplary signaling diagram 300 utilizing the wake up signal. Specifically, the signaling diagram 300 relates to the first exemplary embodiment described above in which the crystal is activated for the duration of the duty cycle. The signaling diagram 300 will describe an exchange of signals between the AP 110 and the station 115. However, it should be clear that the same type of signaling may occur between the AP and the other stations 120 and 125. An initial step may be to determine a beginning of the duty cycle. When the duty cycle starts, the crystal of the WLAN radio 225 may be activated 305. The LP radio 230 may also be activated at the beginning of the duty cycle.

The AP 110 may determine that the station 115 is to receive a beacon and a subsequent data transmission. Thus, the AP 110 generates a wake up signal 310 for the station 115. The wake up signal 310 is transmitted from the AP 110 to the LP radio 130 of the station 115. It should be noted that the wake up signal transmitted to the LP radio 230 may be transmitted in the same band as the signals that will be transmitted to the WLAN radio 225 or may also be transmitted on any other band that is available for transmission. That is, the band on which the wake up signal is transmitted is not important to the exemplary embodiments, merely that the wake up signal is transmitted and received. The LP radio 230 forwards an activation signal 315 to the WLAN radio 225 such that the PHY of the WLAN radio 225 is turned ON 320. As described above, the activation signal 315 may be sent directly from the LP radio 230 to the WLAN radio 225 or via the processor 205. The AP 110 may also activate a timer 325 upon transmitting the wake up signal 310. In the first exemplary embodiment, this timer 325 may be set to 50 µs. The duration of the timer is set based upon a time required for the WLAN radio 125 to be fully awake.

The expiration of the timer 325 indicates when the beacon is to be transmitted by the AP 110. Immediately before the timer 325 expires, the AP 110 may transmit the NOW signal 330 to the WLAN radio 225 which is now awake. The receipt of the NOW signal 330 may also cause the station 115 to activate the MAC 340 to prepare to receive the beacon. The NOW signal 330 may occupy the medium used for the beacon transmission. Thus, when the timer 325 expires, the beacon 335 is transmitted over the known medium without other network traffic commandeering this medium.

After the beacon 335 is transmitted, the AP 110 may optionally transmit a poll 345 for a response. The WLAN radio 225 may determine its status 350 and provide this information via a status signal 355 to the LP radio 230. The LP radio 230 may transmit the station indication signal 360 (e.g., PS-Poll frame) back to the AP 110. As described above, the status indication signal 360 may provide information concerning the station 115 to the AP 110, e.g., the activation state of the WLAN radio 225.

Figure 4:
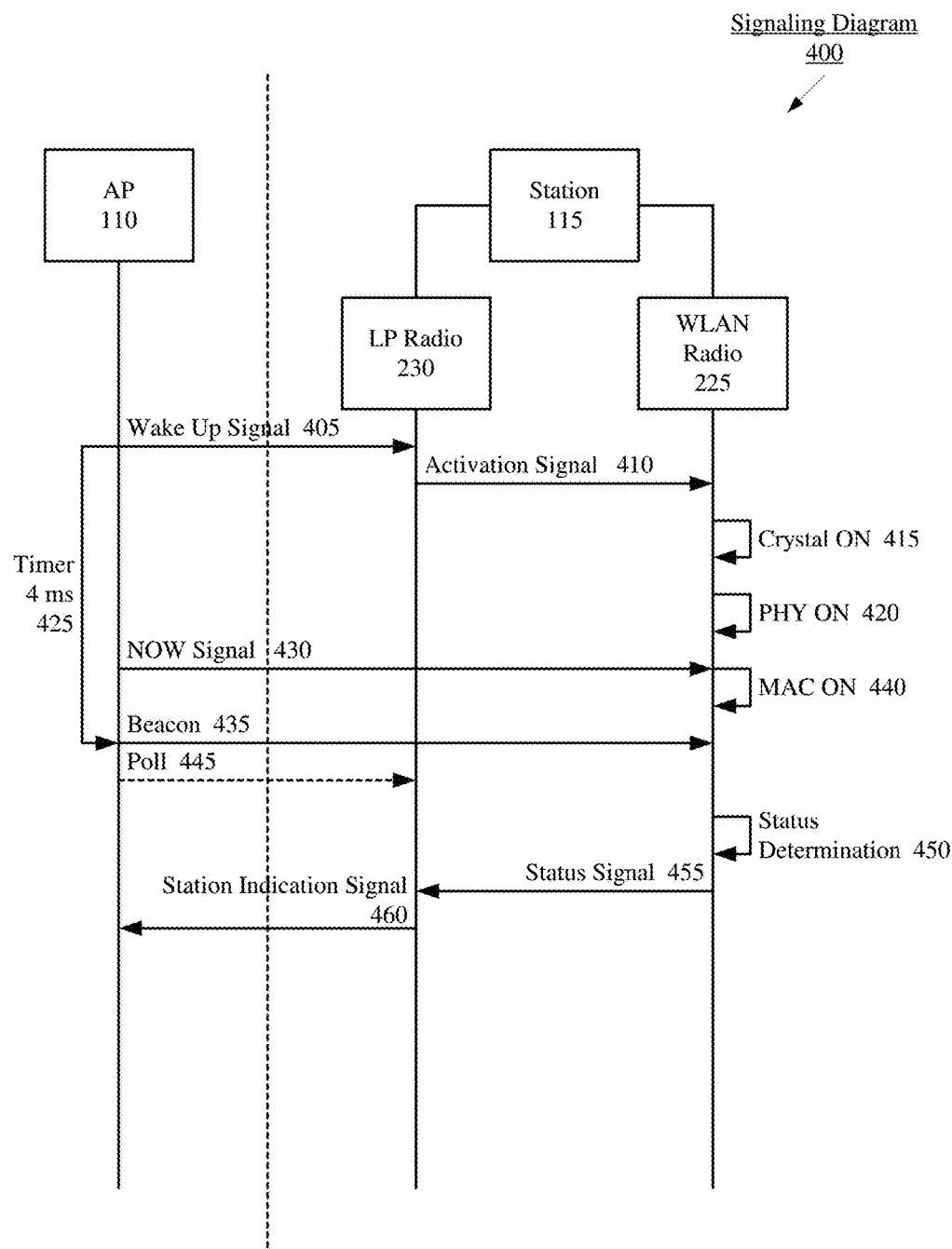
FIG. 4 shows a second exemplary signaling diagram utilizing the wake up signal.

FIG. 4 shows a second exemplary signaling diagram 400 utilizing the wake up signal. Specifically, the signaling diagram 400 relates to the second exemplary embodiment described above in which the multi-stage wake up procedure is used and the crystal is activated after receiving the wake up signal. The signaling diagram 400 will also be used to describe signals that are exchanged between the AP 110 and the station 115. Again, an initial step may be to determine a beginning of the duty cycle. When the duty cycle starts, the LP radio 230 may be activated.

Again, the AP 110 may determine that the station 115 is to receive a beacon and a subsequent data transmission. Thus, the AP 110 generates a wake up signal 405 for the station 115. The wake up signal 405 is transmitted from the AP 110 to the LP radio 230 of the station 115. The LP radio 230 forwards an activation signal 410 to the WLAN radio 225 such that the crystal is activated 415 and the PHY of the WLAN radio 125 is turned ON 420. Upon transmitting the wake up signal 405, the AP 110 may activate a timer 425. In the second exemplary embodiment, this timer 425 may be set to 4 ms. Again, the duration of the timer 425 is set based upon a time required for the WLAN radio 125 to be fully awake. Since, in this embodiment, the activation signal 410 signals that the crystal should be turned on, the timer 425 is set to a longer duration than the timer 325 of the previous embodiment where the crystal was turned on at the beginning of the duty cycle.

Subsequent steps including the transmission of the NOW signal 430 to the WLAN radio 225, the activation 440 of the MAC of the station 115, the transmission of the beacon 435 to the WLAN radio 225, the optional transmission of the poll 445, the status determination 450, the status signal 455 and the station indication signal 460 may be substantially similar to the first exemplary embodiment described above with regard to the signaling diagram 300.

Figure 5:
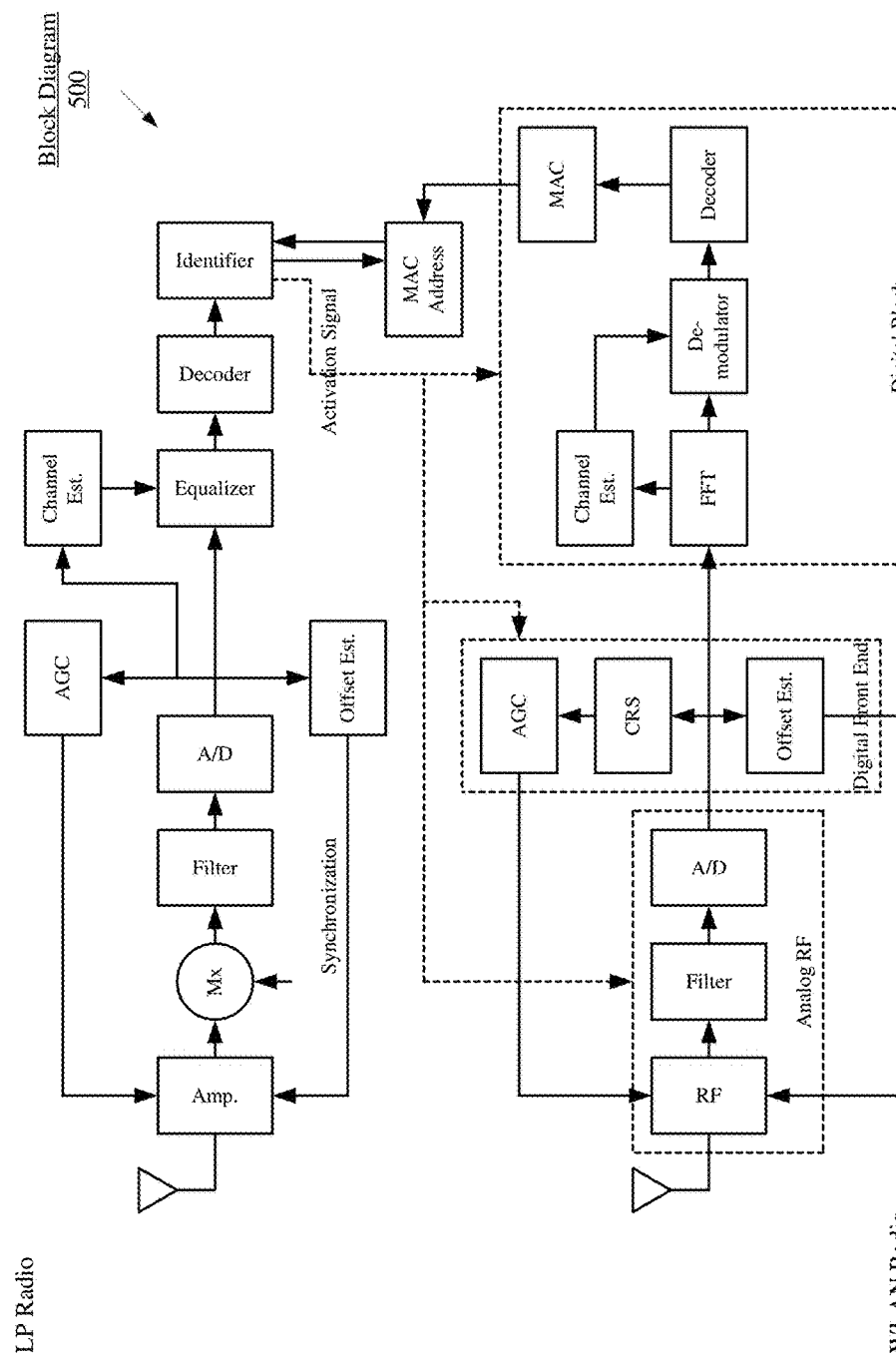
FIG. 5 shows an exemplary block diagram of receiving the wake up signal and subsequent operations.

FIG. 5 shows an exemplary block diagram 500 of an exemplary station receiving the wake up signal and subsequent operations. Specifically, the block diagram 500 illustrates components of the LP radio 230 and the WLAN radio 225 used in the wake up procedure including the use of the wake up signal. As illustrated, the top half of the block diagram 500 may represent the LP radio 230 while the bottom half of the block diagram 500 may represent the WLAN radio 225. Since both the WLAN radio 225 and the LP radio 230 are part of a common station, the MAC address disposed between the WLAN radio 225 and the LP radio 230 may represent a high level layer.

Initially, as discussed above, the LP radio 230 may receive a wake up signal using its antenna. The wake up signal may be processed using a variety of components whose functionality is known to those skilled in the art. For example, the LP radio 130 may include an amplifier module, a mixer, a filter, an analog/digital module, an AGC module, an offset estimation module, a channel estimation module, an equalizer, a decoder, and an identifier. The identifier may generate the activation signal. The activation signal include power on signals that are forwarded to sub-components of the WLAN radio 125 such as the analog RF portion, the digital front end portion, and the digital block portion.

With the power on signals being received, each portion may be activated. Specifically, the crystals may be activated and the PHY may be turned on. The WLAN radio 125 may also include a variety of components whose functionality is known to those skilled in the art. For example, the WLAN radio 125 may include a RF module, a filter, an analog/digital module, a AGC module, a CRS module, an offset estimation module, a channel estimation module, a FFT module, a demodulator, a decoder, and a MAC module. Thus, when the beacon is received by the WLAN radio 125 using its antenna, the beacon may be processed.

The exemplary embodiments provide a system and method for a low power signaling that conserves power. The stations may include a first radio (i.e., WLAN radio) used for receiving a beacon and a subsequent data transmission indicated in the beacon. The stations may further include a second radio (i.e., LP radio) used for receiving a wake up signal that wakes the WLAN radio from a sleep state. Using the LP radio that does not use a high power, the station may conserve a limited power supply by keeping the high power using WLAN radio asleep for longer periods of time and only activating the WLAN radio for pending packets to be received.

It should be noted that the wake up PHY design may relate to minimizing a receiving power and using a transmission power no larger than other 802.11 PHY parameters. That is, the receiving bandwidth, the noise figure, the dynamic range, and LO phase noise requirements are reduced. Since the wake up signal does not include a data payload, the LP radio may be configured with low power consuming components. The wake up signal may have a sensitivity matching a lowest data rate (e.g., 6 Mbps). Furthermore, false alarms are minimized from AWGN and 802.11 traffic. It should also be noted that parameters of 2 or 4-FSK may be with a simple block code. Furthermore, the frequency of operation for the wake up signal may be on an existing channel or a new narrow bandwidth channel (e.g., between channel 6 and 11). In addition, simultaneous wake up signal transmissions may be performed using different tones for each wake up signal with some repetition and/or use a spread spectrum.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
  receiving, by a low power (LP) radio of a station, a first signal from an access point (AP) of a network to which the station is connected, the first signal configured to fully wake a wireless local area network (WLAN) radio of the station;
  receiving, by the WLAN radio, a second signal after the first signal, wherein the second signal wakes up a medium access control (MAC) module of the station and wherein the second signal acts as a placeholder to occupy a medium used to transmit a beacon until the beacon is transmitted;
  receiving, by the WLAN radio of the station, the beacon indicating a data transmission is pending for the station;
  receiving, by the LP radio of the station, a poll from the AP requesting a power mode status of the WLAN radio;

determining, by the station, the power mode status of the WLAN radio; and transmitting, by the LP radio of the station, a station indication signal to the AP, the station indication signal indicating the power mode status.

2. The method of claim 1, further comprising:

activating, by the station, a crystal of the WLAN radio and the LP radio at a beginning of a duty cycle, wherein the first signal turns a physical layer (PHY) of the station on.

3. The method of claim 2, wherein the beacon is received at a time after the first signal is received, wherein the time corresponds to the time for the PHY of the station to turn on.

4. The method of claim 1, further comprising:

activating, by the station, the LP radio at a beginning of a duty cycle, wherein the first signal turns a crystal of the WLAN radio and a PHY of the station on.

5. The method of claim 4, wherein the beacon is received between 3 to 5 ms after the first signal is received, wherein the 3 to 5 ms corresponds to a time for the crystal and the PHY of the station to turn on.

6. The method of claim 1, further comprising:

sending, by the LP radio, an activation signal based on the first signal directly to the WLAN radio that causes the WLAN radio to fully awake.

7. The method of claim 1, further comprising:

sending, by the LP radio, an indication of the receipt of the first signal to a processor of the station; and sending, by the processor, an activation signal to the WLAN radio that causes the WLAN radio to fully awake.

8. A method, comprising:

determining, by an access point (AP) of a network, at least one station of the network to receive a data transmission;

transmitting, by the AP, a first signal to a low power (LP) radio of the at least one station, the first signal configured to wake a wireless local area network (WLAN) radio of the at least one station;

setting a timer based on the first signal is transmitted;

transmitting, by the AP, a second signal after the timer has been set and before transmitting a beacon, wherein the second signal acts as a placeholder to occupy a medium to be used to transmit the beacon until the beacon is transmitted, and wherein the second signal wakes up a medium access control (MAC) module of the at least one station;

transmitting, by the AP, the beacon to the WLAN radio of the at least station, the beacon indicating the data transmission is pending for the at least one station;

transmitting, by the AP, a poll to the LP radio of the at least one station, the poll requesting a power mode status of the WLAN radio of the at least one station; and receiving, by the AP, a station indication signal from the LP radio of the at least one station, the station indication signal indicating the power mode status.

9. The method of claim 8, wherein the beacon is transmitted a predetermined time period after the first signal is transmitted, the predetermined time period being measured by the timer.

10. The method of claim 9, wherein the predetermined time period is one of between 25 to 100 μs when a crystal of the WLAN radio is already activated and between 3 to 5 ms when the crystal of the WLAN radio is deactivated.

11. A station, comprising:

a low power (LP) radio configured to:

receive a first signal from an access point (AP) of a network to which the station is connected;

receive a poll from the AP requesting a power mode status of the WLAN radio;

transmit a station indication signal to the AP, wherein the station indication signal indicates a power mode status; and a wireless local area network (WLAN) radio configured to:

operate in a sleep state until the WLAN radio receives an indication from the LP radio that the first signal has been received, receive a second signal, wherein the second signal wakes up a medium access control (MAC) module of the station, wherein the second signal acts as a placeholder to occupy a medium used to transmit a beacon from the AP until the beacon is transmitted from the AP; and after receipt of the indication, in a fully awake state to receive the beacon from the AP indicating a data transmission is pending for the station.

12. The station of claim 11, wherein the WLAN radio includes a crystal and a physical layer (PHY), wherein the sleep state includes the crystal being powered on and the PHY being in an off or standby state and the fully awake state includes the crystal being powered on and the PHY being powered on.

13. The station of claim 11, wherein the WLAN radio includes a crystal and a physical layer (PHY), wherein the sleep state includes the crystal being powered off and the PHY being in an off or standby state and the fully awake state includes the crystal being powered on and the PHY being powered on.

14. The station of claim 11, wherein the LP radio is configured to operate in a sleep state until activated by a start of a duty cycle.

15. The station of claim 11, further comprising:

a processor configured to receive a further indication from the LP radio that the first signal was received and provide the indication to the WLAN radio.

16. The method of claim 1, wherein the first signal comprises a first field that is a short source address, a second field that is a beacon update and a third field that is a downlink data indication.

17. The method of claim 16, wherein the short source address is one of a partial source MAC address or a hash of a source MAC address.

18. The method of claim 1, wherein the station indication signal comprises a first field that is a short source address, a second field that is a short destination address and a third field that indicates the power mode status.

* * * * *